United States Patent
Robinson (10) Patent No.: US 6,549,388 B2
(45) Date of Patent: Apr. 15, 2003

(54) ELECTRICAL SERVICE APPARATUS WITH SURGE SUPPRESSION PROTECTION

(75) Inventor: Darrell Robinson, Highland Township, MI (US)

(73) Assignee: Ekstrom Industries, Inc., Farmington Hills, MI (US)

( * ) Notice: Subject to any disclaimer, the term of this patent is extended or adjusted under 35 U.S.C. 154(b) by 40 days.

(21) Appl. No.: 09/738,148

(22) Filed: Dec. 15, 2000

(65) Prior Publication Data

US 2002/0075622 A1 Jun. 20, 2002

(51) Int. Cl.[7] .................................................. H02H 3/22
(52) U.S. Cl. ........................................ 361/111; 361/127
(58) Field of Search ................................ 361/111, 118, 361/120, 126, 127, 641–646, 659, 661, 663, 664, 668; 439/146, 167, 508, 517

(56) References Cited

U.S. PATENT DOCUMENTS

| | | | |
|---|---|---|---|
| 4,866,560 A | 9/1989 | Allina | 361/104 |
| 4,875,137 A | 10/1989 | Rozanski et al. | 361/331 |
| 4,881,070 A | * 11/1989 | Burrowes et al. | 324/103 R |
| 4,901,187 A | 2/1990 | Allina | 361/117 |
| 4,931,895 A | 6/1990 | Allina | 361/56 |
| 5,006,950 A | 4/1991 | Allina | 361/117 |
| 5,023,747 A | 6/1991 | Lindsay | 361/117 |
| 5,145,403 A | 9/1992 | Schaffert et al. | 439/508 |
| 5,571,031 A | 11/1996 | Robinson et al. | 439/517 |
| 5,572,396 A | 11/1996 | Robinson | 361/93 |
| 5,577,933 A | 11/1996 | Robinson et al. | 439/517 |
| 5,997,347 A | 12/1999 | Robinson et al. | 439/517 |

* cited by examiner

Primary Examiner—Ronald W. Leja
(74) Attorney, Agent, or Firm—Young & Basile, PC (57) ABSTRACT

An electrical service apparatus housing carries a plurality of line and load blade terminals and jaw contacts. Surge suppression elements are carried on a circuit board mountable within the housing and are connected to certain blade terminals and jaw contacts for conducting electrical surges to ground. Insulating barriers surround the jaw contacts and, also, fixedly position the circuit board in the housing. A switch element is energized when one of the surge suppression elements changes state and provides an externally transmittable signal indicative of the change in state of one of the surge suppression elements. An insulating safety shield surrounds the jaw contacts. A light transmissive guide carried on the shield has a first end disposed adjacent to a light source on the circuit board and an opposed second end visible exteriorly through the housing to provide an exteriorly visible indication of the state of the light source.

18 Claims, 8 Drawing Sheets

ELECTRICAL SERVICE APPARATUS WITH SURGE SUPPRESSION PROTECTION

BACKGROUND OF THE INVENTION

1. Field of the Invention

The present invention relates, in general, to electric power service to homes and buildings and, more specifically, to overvoltage and/or overcurrent devices used with watthour meters mounted in watthour meter sockets at homes and buildings.

2. Description of the Art

Electrical power is supplied to an individual site or service by external electrical power line conductors located above or below ground. In a conventional arrangement, electrical power line conductors are connected to contacts in a watthour meter socket mounted on a building wall. Electrical load conductors are connected to another set of contacts in the meter socket and extend to the electrical distribution network in the building. A watthour meter is connected into the contacts in the meter socket to measure the electric power drawn through the load conductors.

Due to the current trend toward the use of plug-in watthour meters, A to S type socket adapters have been devised which convert A-base type bottom connected watthour meter sockets to receive plug-in watthour meters. Another type of socket adapter has been devised which allows the installation of other devices between the watthour meter socket and a plug-in watthour meter.

Such watthour meter socket adapters have also been provided with power disconnect devices, such as circuit breakers or ground fault circuit interrupters, both for protecting the electrical service as well as, in certain applications, to limit the amount of power supplied to the site. Such power disconnect devices may include an elongated plunger, the end of which extends outwardly through an opening in the annular side wall of the socket adapter when the circuit breaker is in the open or power disconnected position. The exposed end of the plunger can be pushed through the side wall of the watthour meter socket adapter to close the circuit breaker and to reapply power to the site. In certain of these devices, the ends of the plungers extending through the sidewall of the adapter have been colored red for high visibility of a tripped or open condition of the circuit breaker, etc.

Many older homes and buildings, even where originally wired with bottom connected watthour meters, have been converted by electrical utilities to socket style meters by the use of the above-described A to S socket adapter. This type of socket adapter does not require the existing wires to be moved which could cause the insulation which has become brittle with age to fall apart exposing the conductor. If this happens, the conductors and the socket itself need to be replaced which is a time consuming and costly process. This also creates further problems since the service entrance cables into the building should also be replaced and so on down the line through the distribution network as individual conductors are moved.

Currently, homes and buildings often have various electrically powered devices, such as a large number of appliances, computers, medical systems, video display systems, etc., which were not envisioned when the original distribution network conductors were sized to meet a particular maximum load at the time of the original installation. Older homes and buildings have been wired with smaller gauge wires, as small as #12 AWG, with up to and including #6 AWG also being common. The amperage usage in many of these systems exceeds the safe capacity of the individual wires or conductors. Further, due to the age of such wiring installations, the insulation on the individual wires typically is brittle and any movement of the wires for service upgrade could lead to the aforementioned deterioration or separation of the insulation from the wires which could lead to arcing between adjacent conductive elements and electrical fires.

One method to reduce fires in older installations where the insulation on the system wires is deteriorating is to prevent the system voltage levels from becoming too high and arcing. A socket type watthour meter has built-in surge air gaps will generally arc across the gaps at about 2,500 to 5,000 volts in the event of a voltage surge or transient thereby protecting the wiring system up to this voltage level. However, surge or transient voltages less than this level can often cause arcing between the building wires where the wire insulation has deteriorated. Once arcing begins, the arc itself can eventually form a conductive path and fault thereby creating a potential fire hazard. Of course, it is also important that voltage surges and transients be blocked from the distribution system to protect the electrical appliances and electronic devices attached thereto.

To address this problem, current limiting fuses and circuit breakers have been connected by wires between the load jaw contacts and load blade terminals in the socket adapter to create an open circuit at excessive amperage levels. Other surge voltage limiting devices have been connected between the line jaw contacts or blade terminals and ground to shunt voltage surges and transients to ground before such excessive voltages reach the watthour meter or load distribution network.

One such watthour meter base surge suppression system is disclosed in U.S. Pat. No. 5,023,747. In this device, a pair of surge suppressors in the form of metal oxide varistors are each connected to an electrical contact element which is in turn connected to the jaw contacts of a watthour meter socket. Voltage surges present on the blade terminals are conducted via the metal oxide varistors to respective fuses in the form of fusible links and then to ground to prevent the surges from being transmitted through the watthour meter and onto the electrical load distribution network. This surge suppression system also includes a diagnostic circuit which couples the varistors to an audible signal generator, such as a buzzer, which indicates that one of the fusible links has ruptured upon the occurrence of a line surge.

Such surge suppression systems have also been proposed with a visual indication that one of the fusible links or MOVs has opened due to the occurrence of a line surge. However, the surge suppression elements are mounted within the interior of a watthour meter socket adapter or socket and not visible exteriorly of the socket or socket adapter due to the need to sealingly enclose the watthour meter in the socket in order to prevent contact with the high voltage in the socket or to prevent tampering with and/or theft of electric power from the socket. Thus, unless an individual is within the vicinity of the socket adapter to hear the audible sound generator, the occurrence of an open circuit in the surge suppression device due to a line surge is not likely to be detected. Further, after the surge has passed and voltage and current levels have returned to normal, there is no indication the exteriorly of the socket adapter that one or more of the surge suppression devices is open and thereby not providing any surge suppression protection for the meter socket.

Small neon lamps have been mounted on the sidewall of the adapter or surge to indicate a change in state of the surge suppression devices. However, such lamps are prone to breakage and could leave unsafe, broken or disconnected electrical wires in the housing.

Thus, it would be desirable to provide the watthour meter socket adapter having a provision for providing a signal indicative of the opening of a surge suppression device within the socket adapter. It would also be desirable to provide the watthour meter socket adapter which provides an external visual signal to indicate that one or more of the surge suppression devices within the socket adapter has opened.

SUMMARY OF THE INVENTION

The present invention is an electrical service apparatus having surge suppression protection.

The electrical service apparatus, such as a watthour meter socket adapter, includes a housing having a hollow interior. A plurality of line and load jaw contacts are mounted in the housing for receiving the line and load blade terminals of a watthour meter. A plurality of line and load blade terminals are also mounted in the housing and extend outward from the housing for insertion into electrical connection with jaw contacts in a watthour meter socket. Surge suppression means are mounted in the housing and coupled between ground potential and the line and load jaw contacts or blade terminals for conducting electrical surges and transients to ground.

In a preferred embodiment, the housing includes a base with a central wall. The line and load blade terminals and jaw contacts are mounted in the central wall of the base.

Unique insulating brackets or barriers are carried on the central wall of the base and surround each jaw contact. The barriers interact with flange and edge portions of each jaw contact to securely position each jaw contact in the base, with the jaw contact portion disposed interiorly within the socket adapter in position for receiving a blade terminal of a watthour meter, and the blade terminal extending through the base exteriorly of the rear wall of the base for insertion into jaw contacts in a watthour meter socket.

The surge suppression means is mounted on the central wall of the base. Preferably, the surge suppression means comprises a plurality of metal oxide varistors, each of which is connected to one of the load blade terminals and ground potential.

The surge suppression elements are mounted on a circuit board having a predetermined peripheral edge configuration. The peripheral edge configuration is disposed between the barriers on the central base wall for positioning and supporting the circuit board in position between the jaw contacts in the base.

In one aspect of the invention, the peripheral edge configuration of the circuit board has a T-shape with a short leg extending generally centrally of an elongated stem carrying the surge suppression elements or metal oxide varistors. The stem is designed to fit between certain of the insulating barriers to position the circuit board laterally on the base and the leg is disposed between other barriers to position the circuit board longitudinally on the base.

In another aspect, the short leg on the circuit board may be eliminated such that the circuit board has a generally rectangular configuration disposable centrally on the base between spaced portions of the insulated barriers. A mounting screw also used to attach a ground wire to the circuit board may be inserted through the circuit board into the base to secure the circuit board to the base.

According to a unique feature of the present invention, a signal generating means, such as a switch or a relay having a switchable contact, is energized by a signal generated by the surge suppression elements and/or circuit to indicate that one of the surge suppression devices has opened. Activation of the relay either closes a normally open contact or opens a normally closed contact to send a signal to a signal receiving remote circuit, such as to automatic meter reading equipment which may be mounted internally or externally of the socket adapter or an alarm or buzzer in the adjacent building. This signal may be reported by the automatic meter reading equipment to its central host system to provide a utility or to provide an indication in the building that at least one of the surge suppression elements in a particular metered site has opened.

In another aspect of the present invention, an insulating shield is disposed over the jaw contacts and includes apertures alignable with the jaw contacts in the housing to allow the blade terminals of a watthour meter to pass therethrough into contact with the jaw contact; while enclosing the jaw contacts to prevent inadvertent contact by a utility service person. The safety shield uniquely includes a unique light transmitting means or guide integrally carried on the shield which has a first end positioned adjacent to the visible light generating device, such as at least one LED, on the surge suppression circuit board to transmit the light generated by the LED, indicating the state of at least one of the surge suppression devices to an opposed second end which is positioned relative to the sidewall of the socket adapter housing to be visible exteriorly of the socket adapter housing. Preferably, the second end of the light transmitting means or guide is disposed through or viewable through an aperture in the sidewall of the housing so as to be readily visible exteriorly of the housing. A seal carried on the light guide seals the aperture in the sidewall of the housing.

The watthour meter socket adapter with surge suppression protection according to the present invention provides several advantages and improvements over previously devised watthour meter socket adapters carrying surge suppression circuits.

First, the insulating barriers disposed adjacent to each of the jaw contacts in the socket adapter housing serve a dual function which, in addition to locating and positioning the jaw contacts on the base, are also disposed in engagement with the peripheral edge of the surge suppression circuit board to position and locate the circuit board on the base.

The provision of a signal generator, such as a relay, which is activated by the signal generated by the surge suppression circuit when one of the surge suppression elements changes state, is uniquely employed to provide an external signal, such as to automatic meter reading equipment, to provide an indication to the utility that at least one of the surge suppression elements in a particular meter site has changed state.

Finally, the use of a light transmitting means or guide on the safety shield enables the light generator or LED, which is activated when the change of state of at least one of the surge suppression devices, to be viewed exteriorly of the socket adapter. This prevents a prior art externally mounted surge suppression device state indicator from being broken and exposing unsafe electrical wires.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
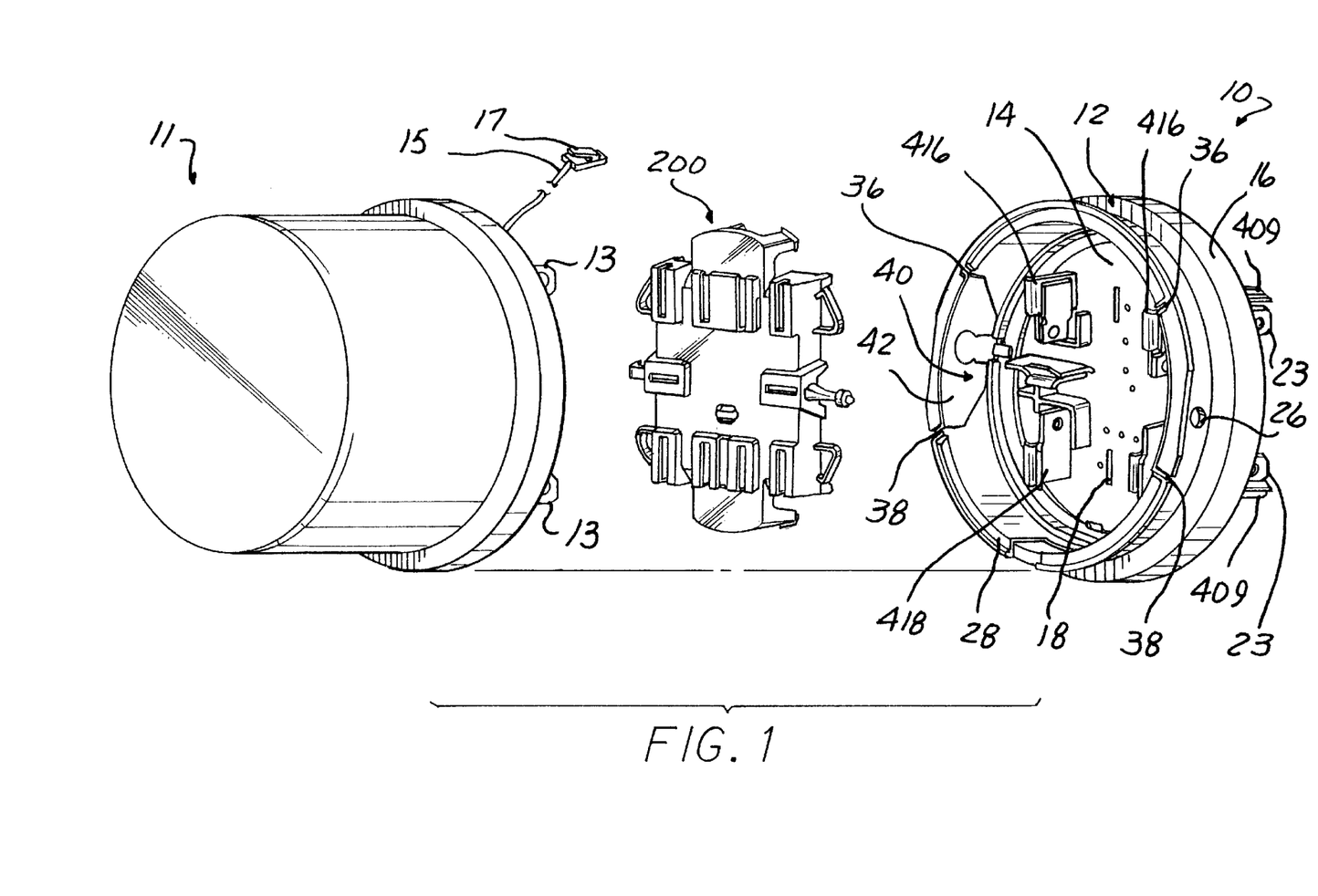
FIG. 1 is an exploded, perspective view of a watthour meter mountable in a watthour meter socket adapter, an insulating safety shield, and surge suppression means constructed in accordance with the teachings of the present invention.

In order to better describe and appreciate the advantages of the present invention, a description of the conventional construction of an electric service apparatus, such as a watthour meter socket adapter or socket extender/adapter, both hereafter referred to as "a socket adapter", will be provided with reference to FIGS. 1–9 A conventional socket adapter 10 includes contacts designed to receive blade terminals 13 of a conventional electric watthour meter 11 in a releasable connection. The socket adapter 10 also includes terminals, described hereafter, which plug into mating contacts in a watthour meter socket, not shown. The number of contacts and terminals in the socket adapter 10 will vary depending upon the type of electric service at a particular user site, FIG. 1 depicts, by way of example only, a single phase electric service. FIG. 1 depicts, by way of example only, a single phase electric service. Preferably, the socket adapter 10 includes a housing 12 is integrally molded from a suitable electrically insulating material, such as polycarbonate.

The housing 12 includes a base 14 with a peripheral flange 16. A plurality of apertures 18, are formed in the base 14 at the convention, at the jaw contact positions in a socket adapter 10. Mounting feet 24 extend from the outer surface of the base 14 and are disposed adjacent to the blade terminals 23.

An annular sidewall 26 extends from the base 14 to an outer meter mounting flange 28.

Figure 2:
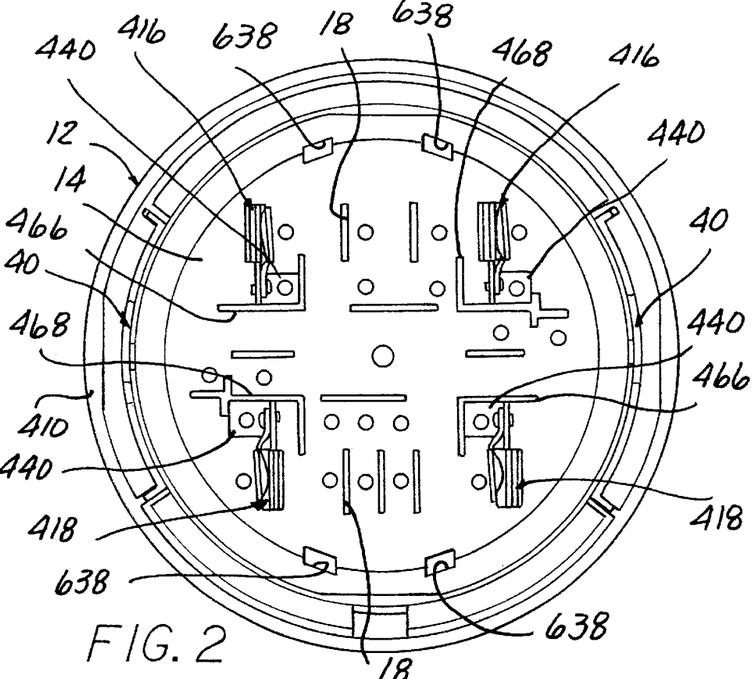
FIG. 2 is a front elevational view of the watthour meter socket adapter and jaw blades shown in FIG. 1, without the safety shield.

The socket adapter 10 also has a ground surge means mounted therein. As shown in FIGS. 1 and 2, at least one pair of slots 36 and 38 are formed in the mounting flange 28. The slots 36 and 38 are spaced apart on the mounting flange 28 and extend from an inner edge of the mounting flange 28 at the juncture of the inner surface of the mounting flange 28 and the side wall 26 to a termination short of the peripheral edge of the mounting flange 28. In a preferred embodiment, two pairs of slots 36 and 38 are formed on the mounting flange 28, each pair of slots 36, 38 generally diametrically opposed from the other pair of slots as shown in FIGS. 1 and 2.

At least one and preferably two identical surge ground conductors 40 are diametrically mounted opposite each other on the mounting flange 28. Each surge ground conductor 40 is removably mounted in one pair of slots 36 and 38 and includes an arcuate wall portion 42 which conforms to the inner diameter of the annular side wall 26 of the housing 12. The arcuate wall portion 42 has an upper edge 44 and a lower edge 46. A pair of radially extending tabs are formed on opposite side ends of the arcuate wall portion 42 generally adjacent the upper edge 44. Each tab has a lower edge which seats in a lower portion of one of the slots 36 and 38 on the mounting flange 28. Each tab has an upper edge extending at an angle away from a planar lower edge to dispose the top edge 44 of each surge ground conductor 40 slightly above the upper edge of the mounting flange 28. This places the upper edge of each surge ground conductor 40 at a position to electrically engage a ground terminal mounted on the rear surface of a conventional watthour meter.

Each surge ground conductor 40, as shown in FIGS. 1 and 2, has a cutout 60 formed in the lower edge 46. As described in U.S. Pat. No. 5,997,345, the contents of which are incorporated herein in its entirety, a movable mounting foot or tab is pivotally connected by fingers to the lower edge 46 of the arcuate wall portion 42. The mounting foot 62 has a generally planar shape. Opposite from the mounting foot and contiguous therewith is a second planar portion or flange 66 having an optional aperture 68 formed therein.

In an initial, pre-mounted state, the mounting foot and contiguous flange 66 are generally in-line with the annular side wall 42 of each surge ground conductor 40. The mounting foot is designed to be slidably inserted through an aperture formed at the juncture of the base 14 and the annular side wall 26 of the socket adapter housing 12. Two slots are diametrically formed in the housing 12. One mounting foot is inserted through one slot after being bent generally perpendicular to the annular side wall 42 until the foot is disposed in proximity with the base 14 of the housing 12 to securely attach each surge ground conductor 40 to the housing 12.

At the same time, the pivotal or bending movement of the mounting foot also causes a pivotal movement of the flange 66 to a radially inward extending position within the housing 12. In this position, the flange 66 is located to provide an easy connection with an electrical conductor to connect the electrical conductor to the surge ground conductor 40. Further, the flange 66 is preferably configured to receive a slide-on, quick connector attached to one end of an electrical conductor. By use of the integral mounting foot 62, each surge ground conductor 40 may be securely attached to the socket adapter housing 12 without the need for a separate fastener, rivet, etc.

As described in detail in co-pending patent application, Ser. No. 09/148,253 filed Sep. 4, 1998, the contents of which are incorporated herein in its entirety, each jaw contact 80 is preferably formed of apertures, such as slots 404, are formed completely through the base 402.

Referring now to FIGS. 3–9, the base 14 of the socket adapter 10 is of generally circular shape. The apertures 18, such as slots, are formed completely through the base 14. Preferably, the apertures or slots 18 having an elongated, rectangular shape suitable for receiving the blade terminal of a jaw blade assembly as described hereafter. The slots 18 are positioned at the normal jaw contact positions of a watthour meter and watthour meter socket.

An annular ring surrounds the periphery of the base and forms part of a base of the socket adapter 10. An annular lip 408 projects perpendicularly from the outer edge of the ring and forms the inner edge of a peripheral edge flange 16.

The outer end of the sidewall 26 terminates in a radially outward extending mounting flange 28 which is adapted for mating with a complementary mounting flange on a watthour meter. The mounting flange 38 is surroundable by a conventional sealing ring, not shown, to sealingly join the watthour meter 11 to the socket adapter 10 in a conventional manner.

For the single phase socket adapter 10 shown in FIGS. 1 and 2, a pair of line jaw blades 416 and a pair of load jaw blades 418 are mounted in the base 14 in the appropriate jaw contact/blade terminal positions for a single phase watthour meter/watthour meter socket application. A similar jaw blade 420 may also be provided at the fifth ground contact position.

As each of the line, load and ground or fifth position jaw blades 416, 418 and 420 are substantially identically constructed, the following description of a first embodiment of the jaw blade 416, as shown in FIGS. 4–7, will be understood to apply equally to all line, load and ground jaw blade assemblies.

Figures 4, 5, 6, 7:
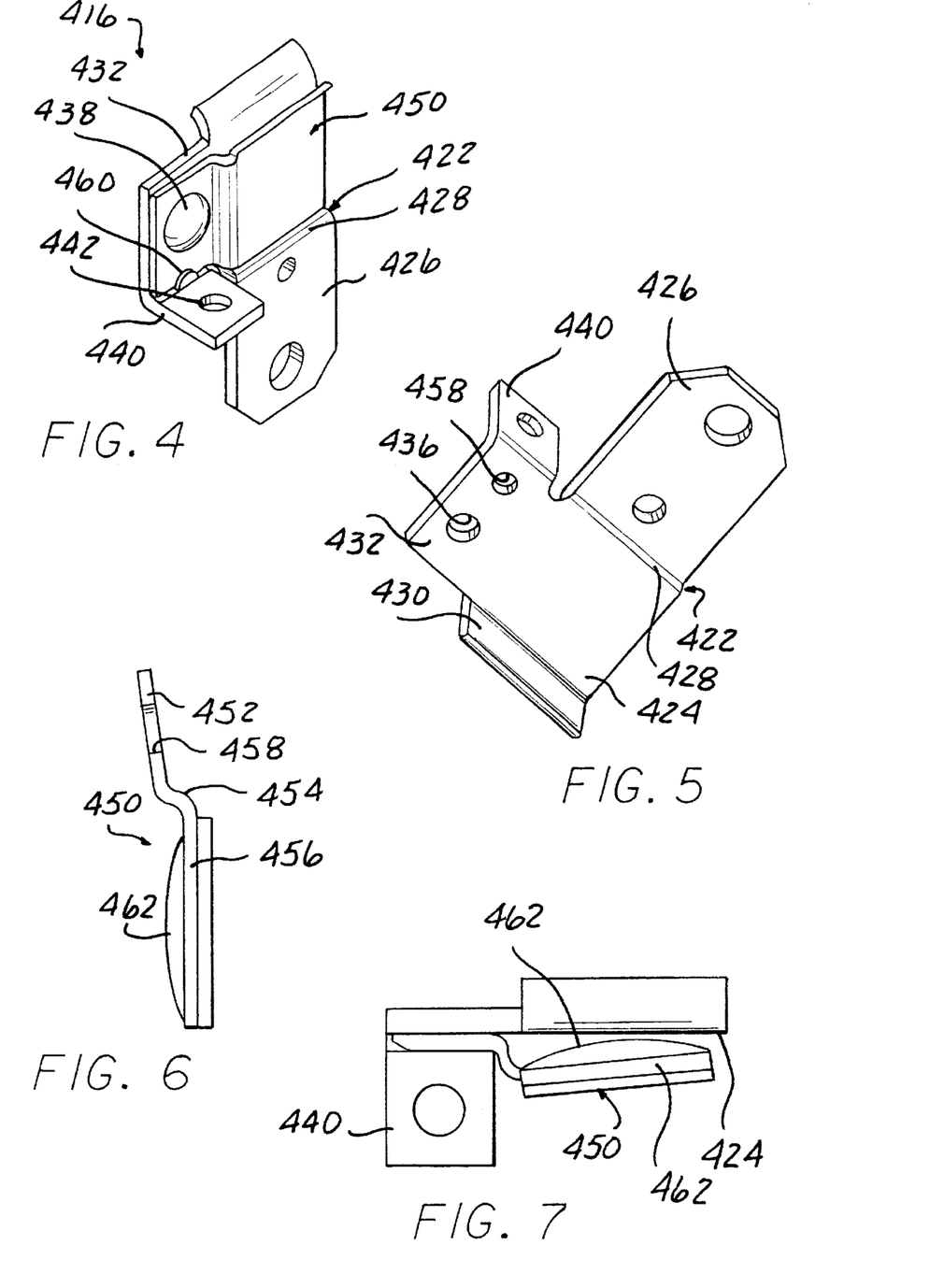
FIG. 4 is a enlarged, perspective view of one of the jaw blades shown in FIG. 2.
FIG. 5 is a perspective view of a bus bar portion of the jaw blade shown in the FIG. 6.
FIG. 6 is a side elevational view of the spring clip shown in FIG. 4.
FIG. 7 is a side elevational view of the assembled jaw blade shown in FIG. 4.

As shown in FIG. 5, the jaw blade 416 includes a one piece, unitary, electrically conductive bus bar 422 which is formed with a jaw end 424 and an opposed blade terminal end 426. The bus bar 422 is formed of an electrically conductive material, such as copper, or plated copper for example. An offset 428 is formed intermediately between the jaw end 424 and the blade terminal end 426 to offset the plane of the jaw end 426 from the plane of the blade terminal end 426.

An angled edge guide 430 is formed along one edge of the jaw end 424 to assist in guiding a watthour meter blade terminal, not shown, into contact with the jaw end 424 as described hereafter. An extension 432 projects unitarily from the jaw end 424 co-planarily with the jaw end 424. The extension 432 serves as a mounting base for a spring clip 434 described in greater detailed hereafter. An aperture 436 is formed in the extension 432 for receiving a fastener, such as a rivet 438, used to mount the spring clip 434 on the bus bar 422.

A tab 440 projects angularly, preferably perpendicularly, from one edge of the extension 432. The tab 440 is positioned intermediate the jaw end 424 and the blade terminal end 426 of the bus bar 422 and also extends generally perpendicularly from the jaw end 424 and the blade terminal end 426. An aperture 442 may be formed in the tab 440 for receiving a fastener, not shown, to secure an auxiliary electrical conductor, not shown, to the tab 440 and jaw blade 416. However, the tab 440 serves a more important mounting function for the jaw blade assembly 416 as described hereafter.

As shown in FIGS. 6 and 7, the jaw blade 416 also includes a spring clip 450 which is formed of a spring or resilient material, such as spring steel. The spring clip 450 includes a base 452 which is connected by an intermediate, offset 454 to a contact end 456.

The base 452 is initially pre-bent from a planar adjacent the offset 454, as shown in FIG. 6. An aperture 458 in the base 452 receives the fastener or rivet 438. Insertion of the rivet 438 through the aperture 458 and the corresponding aperture 436 in the extension 432 on the bus bar 422 bends end of the base 452 into planar, full contact engagement with the extension 432 to apply spring force to the spring clip 450.

The single fastener or rivet 438 can be employed to fixedly mount the spring clip 450 on the bus bar 422 since a centering and locating dimple 458 and mating dome 460 are respectively formed in the bus bar 422 at the juncture between the extension 432 and the tab 440 and on one side edge of the base 452 of the spring clip 450. The engagement of the dimple 458 and the dome 460 locates the spring clip 450 with respect to the bus bar 422 and prevents rotation of the spring clip 450 relative to the bus bar 422 after the rivet 438 is inserted to fixedly attach the spring clip 450 to the bus bar 422.

As shown in FIGS. 6 and 7, the contact end 456 of the spring clip 450 has a generally concave shape with a raised center contact surface 462 facing the adjacent jaw end 424 of the bus bar 422. Since the forced engagement of the rivet 438 with the angled base 452 of the spring clip 450 places a spring force on the spring clip 450 biasing the contact end 456 toward the adjacent jaw end 424, the raised center 462 of the contact end 456 forms an adequate contact surface with a watthour meter blade terminal inserted through a slot 464 formed between the raised center surface 462 of the spring clip 450 and the adjacent face of the jaw end 424 of the bus bar 422.

Figure 3:
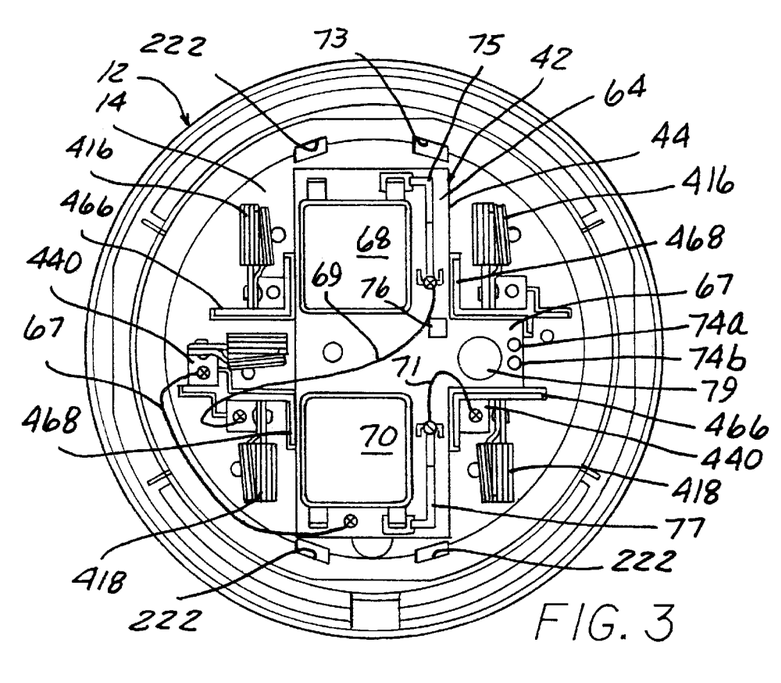
FIG. 3 is a perspective view of the watthour meter socket adapter with the surge suppression means of the present invention mounted therein, the safety shield not being shown.

Referring, now to FIGS. 2 and 3 there is depicted mounting means for non-rotatingly mounting each of the line and load jaw blades 416 and 418, as well as the optional ground jaw blade 420, relative to the base 14 of the socket adapter 10. The mounting means includes a plurality of irregularly shaped brackets or flanges of two types 466 and 468, by example only. The flanges 466 and 468 are unitarily formed with the base 14 and project upwardly from the base wall 14 within the interior space formed between the base 14 and the sidewall 26.

The flanges 466 have a generally L-shape and are positioned to engage at least two sides of the mounting tabs 440 on one line jaw blade 416 and one load jaw blade 418. The other flanges 468 have an irregular shape with one pair of perpendicularly oriented surfaces positioned to engage two edges of the tabs 440 on one line jaw blade 416 and load jaw blade 418. Other portions of the flanges 468 are positioned to engage the tabs 440 on the optional ground jaw blade 420.

In this manner, when each line and load jaw blade 416 and 418 is inserted through one of the slots 18 in the base 14, the respective tabs 440 will seat on the base 14 and engage the respective flanges 466 and 468. This aids in preventing sideways movement of each of the line and load jaw blades 416 and 418 in the respective slot 18 in the base 14.

Figure 8:
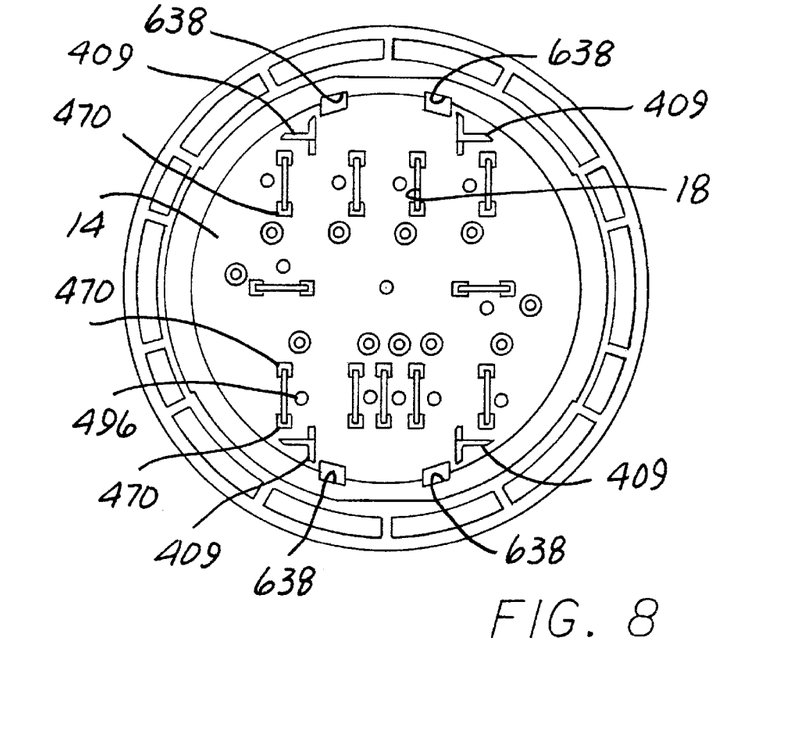
FIG. 8 is a rear elevational view of the socket adapter housing depicted in FIG. 2.
Figure 9:
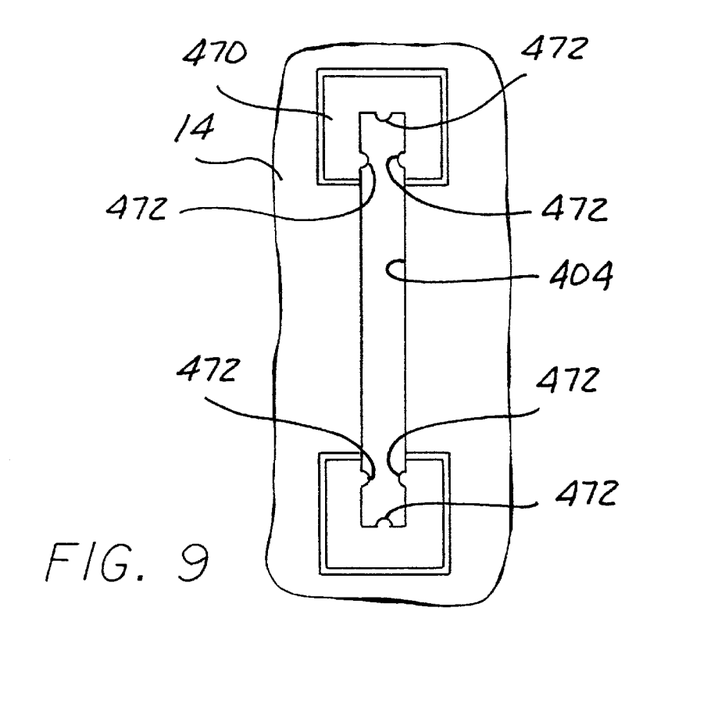
FIG. 9 is an enlarged, partial view of one of the jaw blade mounting apertures depicted in FIG. 8.

FIGS. 8 and 9 depict a rear or exterior surface of the base 14. The mounting means also includes at least one and preferably a pair of opposed U-shaped flanges 470 which are formed on the base wall 14 and disposed on opposite ends of each slot 18. Each U-shape flange 470 is positioned to engage one side edge of the blade terminal end 426 of one line or load jaw blade 416 or 418 to assist in preventing sideways pivot able movement of the jaw blade 416 or 418 in the slot 18.

The mounting means also includes at least one and preferably a plurality of bosses 472, such as three, by example only, which are unitarily formed on the base wall 14 in opposed ends of each jaw blade mounting slot 18. Each boss 472 extends into the slot 18 and is adapted for engaging the blade terminal end 426 of one line or load jaw blade 416 or 418 to securely fix the blade terminal end 426 in the slot 18 without movement. The bosses 472 are arranged in pairs side edge to side edge of the slot 404 or on opposite sides of the slot 18.

As shown in FIG. 3, surge suppression means 40 is mounted within the socket adapter housing. The surge suppression means 40 includes a circuit board 42 having an external periphery 44 of a predetermined configuration. The circuit board periphery 44 is configured to fit snugly between certain of the brackets or barriers 466 and 468 carried on the base 14 of the socket adapter housing 12. In a preferred embodiment, the circuit board 42 has a generally T-shaped form of an elongated stem 46 and a shorter leg 67 extending centrally from one side of the stem 64.

A pair of surge suppression elements 68 and 70 are mounted on the circuit board 42 and are electrically connected to certain jaw contact terminals as described herein. In a preferred embodiment, the surge suppression elements 68 and 70 are formed as metal oxide varistors (MOV) having a generally flat, planar shape As a conventional, varistors conduct at a predetermined voltage to conduct any voltage surges or transients imposed on one of the line or load jaw blade terminals connected thereto to ground thereby preventing such voltage surges or transients imposed on the load distribution network. One or more additional varistors may be connected in parallel with the varistors of the first suppression elements 68 and 70.

As can be seen in conjunction with FIG. 3, electrical conductors are attached, by soldering or other suitable fastening means, to the circuit board 42. In the five-jaw socket adapter shown in FIG. 3, where the fifth jaw is connected to ground conductor 67 via a socket ground, one conductor 69, which is connected via traces on the circuit board 42 to one varistor 68, is connected to one load jaw via the jaw tab 440. Another conductor 71 is connected to the other varistor 70 and to the tab 440 on the opposed load jaw. Screw eyelets may be employed on the conductors 69 and 71 for connection to the jaw tabs. Fast-on clip connectors may also be employed for conductor jaw connection.

In the case of a four-jaw socket adapter, the ground connection on the circuit board 42 can be connected to an external ground via a quick connect or plug-in connection.

One mounting leg of each varistor, such as varistor 68, is electrically connected to a conductive terminal or pad 73 on the circuit board 42. Also connected to the pad 73 is one leg of a spring biased, electrically conductive strip 75, the other leg of which is electrically connected, preferably by solder, to a conductive pad or element on the circuit board 42 to which one end of the conductor 69 is connected. In this manner, the varistor 68 is electrically connected through the strip 75 and conductor 69 to one load jaw 418. The same circuit is employed with the other varistor 70 such that an electrical circuit is formed between the varistor 70, a spring biased contact element 77, the conductor 71 and the other load jaw 418.

The varistors 68 and 70 are capable of shunting or diverting any overvoltage surges which may appear on the conductors attached to the load jaws 418 to ground. Other more longer lasting surges, which may not open either varistor 68 or 70 may be sufficient in duration and current to cause the solder connection on one end of the spring biased contacts 75 or 77 to melt thereby releasing the contacts 75 or 77 and breaking the circuit between the respective load jaw 418, conductor and varistor. The contacts 75 and 77 thus provide thermal protection for the varistors 68 and 70. However, once the contacts 75 or 77 open, breaking current flow to either varistor 68 or 70, respectively, they do not reclose. Thus, continued operation of the meter mounted in the socket adaptor housing 12 is without surge protection.

Circuitry on the circuit board 42 connects electrical power to at least one, and preferably two, illuminating devices such as LEDs 74a and 74b. LED 74a is illuminated whenever a conductive path is formed between the conductor 69, the strip 75 and the varistor 68 and through the conductor 71, the contact strip 77 and the varistor 70 to provide an indication that the varistors or surge suppression elements 68 and 70 are in a conductive, operative state. The LED 74a can be of any color, with green being chosen by way of example only to indicate a "power on" condition.

However, when either of the contact strips 75 and 77 opens, the other LED 74b is illuminated. The LED 74b can be red, by example only, to indicate that at least one of the surge suppression circuit has opened such that at least a portion of the line or load service to the use site is without surge protection. A separate sound generating device, such as a buzzer, may also be mounted on the circuit board 42 and activated by the same signal used to illuminate the LED 74b. The same signal used to energize the LED 74b is also used to energize a signal generating device, such as a relay or circuit 76 on the circuit board 42. The relay 76 has a switchable contact which is connected to a source of electrical power and can be coupled to a lead or terminal on the current board 42 and, from there, to an external circuit, such as to automatic meter reading equipment mounted within or external to the socket adapter housing 12. The switch closure (or opening) provides a signal that one or more of the surge suppression devices 68 and 70 in the socket adapter housing is open and non-operative. This signal can be relayed through the automatic meter reading equipment to the central host utility station for further action by the utility. The signal can also be sent to an external signal receiving device, such as a buzzer, within the building of the use site to provide the customer with an indication of the loss of surge protection on the metered electrical service.

It will also be understood that the circuit board 42 may take other shapes consistent with the open area between certain of the brackets or barriers 466 and 467. Thus, in one specific example, the circuit board 42 may have a generally elongated, polygonal or rectangular shape essentially the same as the stem portion of the circuit board 42 shown in FIG. 2. This circuit board configuration places the peripheral edge 44 of the circuit board 42 in engagement with one leg of each of the insulating brackets or barriers 466 and 468 to position the circuit board 42 laterally within the socket adapter housing. A fastener, such as a screw, can be threaded through the circuit board 42 into the base of the socket adapter housing to secure the circuit board 42 in a fixed position within the socket adapter house. The same screw can also be used to provide a ground connection to the circuit board 42.

Referring now to FIGS. 1 and 10–15, there is depicted a jaw contact safety shield 200 which is optionally mountable in the socket adapter housing 12. The safety shield 200 is formed of a one-piece, electrical insulating material, such as a suitable plastic, and, when mounted in the socket adapter housing 12, completely surrounds all of the line and load jaw blades within the socket adapter except for small slots allowing the insertion of one watthour meter blade terminal into engagement with each line and load jaw contact in the socket adapter.

The safety shield 200 includes a top or outer wall 202 and a plurality of sidewalls all denoted by reference number 204. A plurality of raised bosses 206 are formed on the top wall 202. The bosses 206 are positioned at the normal jaw contact positions of a watthour meter socket adapter.

Each boss 206 has an aperture or slot 208 formed therein. Each slot 208 has a top wall portion 210 extending parallel to the plane of the top wall 202 and a contiguous sidewall portion 212 forming a continuous L-shaped slot along the top wall 202 and the sidewall 204 of the safety shield 200. The provision of the side slot portion 212 simplifies the insertion or removal of the watthour meter into and out of the jaw contacts in the socket adapter through the safety shield 200.

Figure 14:
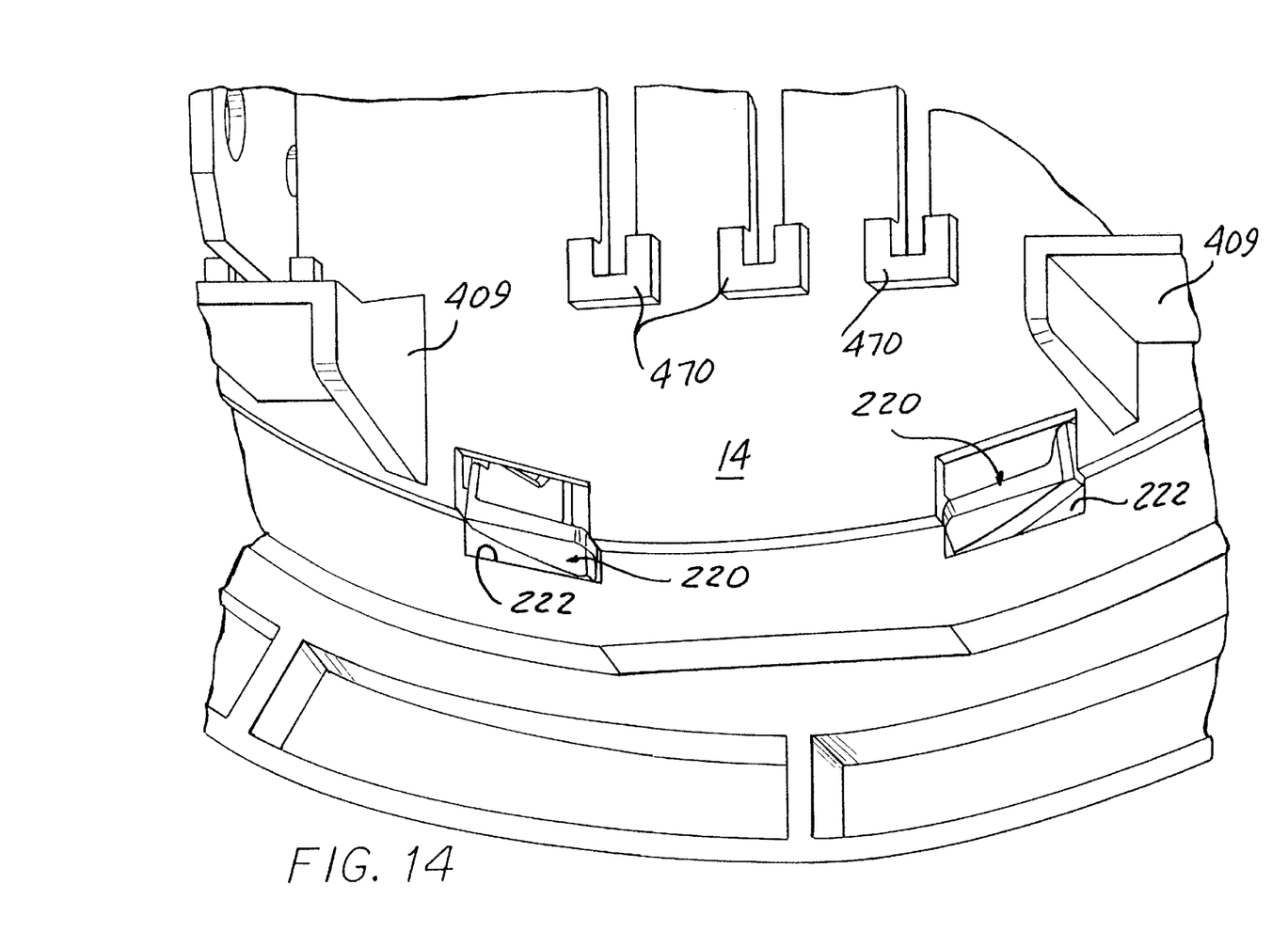
FIG. 14 is a partial, enlarged, rear elevational view showing the mounting legs of the safety shield in an attached position in the watthour meter socket adapter base.

A plurality of end flanges 216 are formed on opposite edges of the sidewall 204 and project outwardly from each adjacent sidewall 204. Each end flange 216 has a pair of downwardly depending legs 218 extending therefrom, each leg 218 terminating in an outwardly extending latch projection 220. The latch projection 220 in each leg 218 is releasably insertable through one aperture 222 in the base 14 of the socket adapter housing 12 as shown in FIG. 14.

Figure 11:
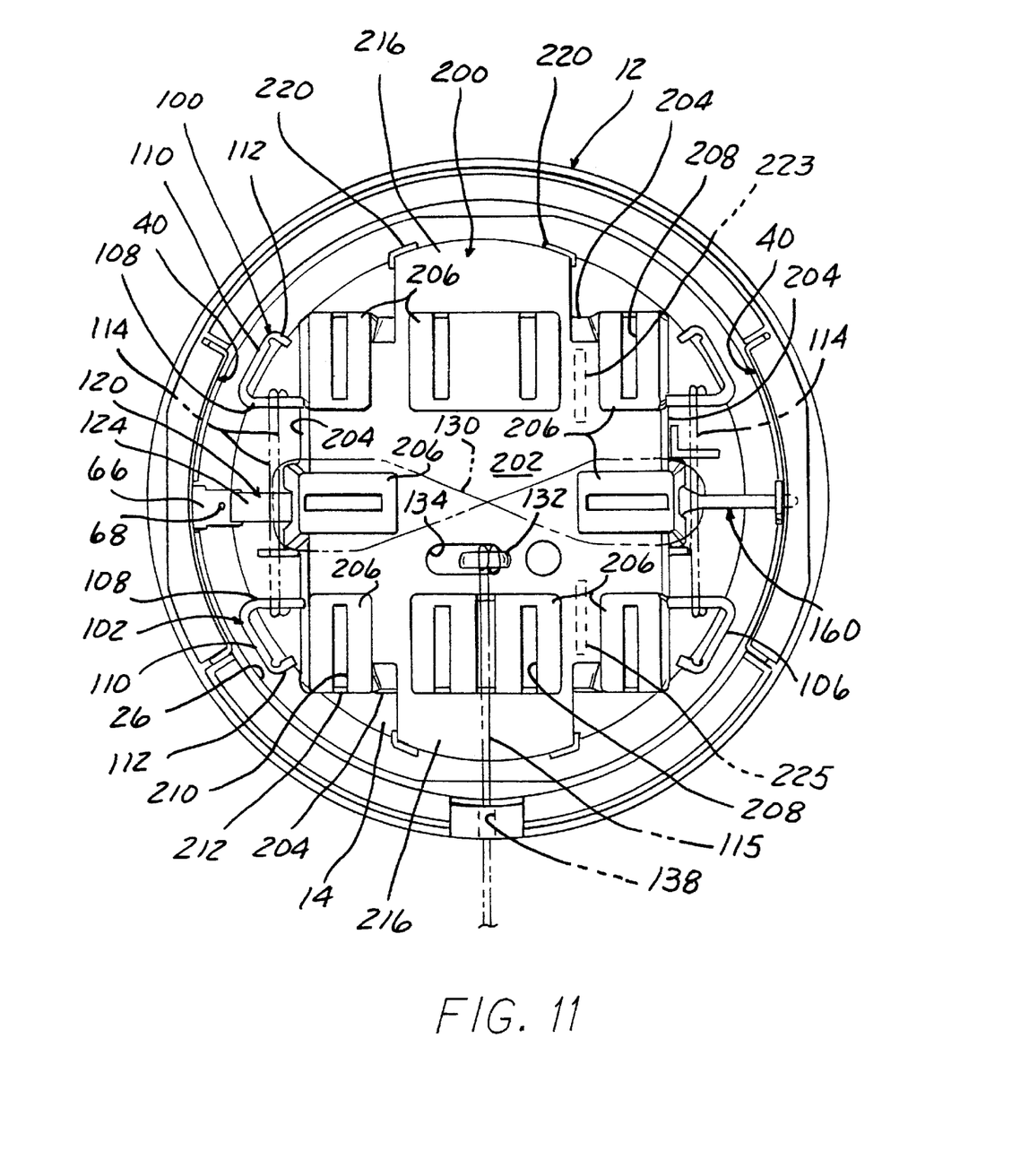
FIG. 11 is a front elevational view showing the safety shield of FIG. 10 mounted in the socket adapter depicted in FIGS. 1–3.
Figure 12:
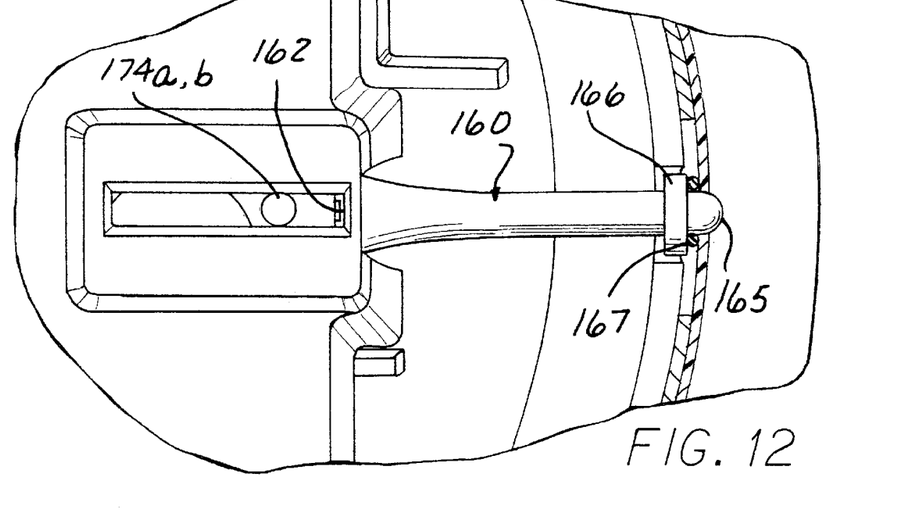
FIG. 12 is a partial, enlarged, front elevational view of the safety shield shown in FIG. 10 and a watthour meter socket adapter.

As shown in FIG. 11, an electrically isolating barrier 223 is carried or formed on the inside surface of the shield 200 at a position which is disposed between one line jaw 416 and the electrically conductive strip 75, shown in FIG. 3, as well as a barrier 225 disposed between the conductive strip 77 and one load jaw 418 when the shield 200 is mounted in the housing 12. The barriers 223 and 225 prevent arcing between the contact strips 75 and 77 and the closely disposed jaw blade terminals.

Figure 10:
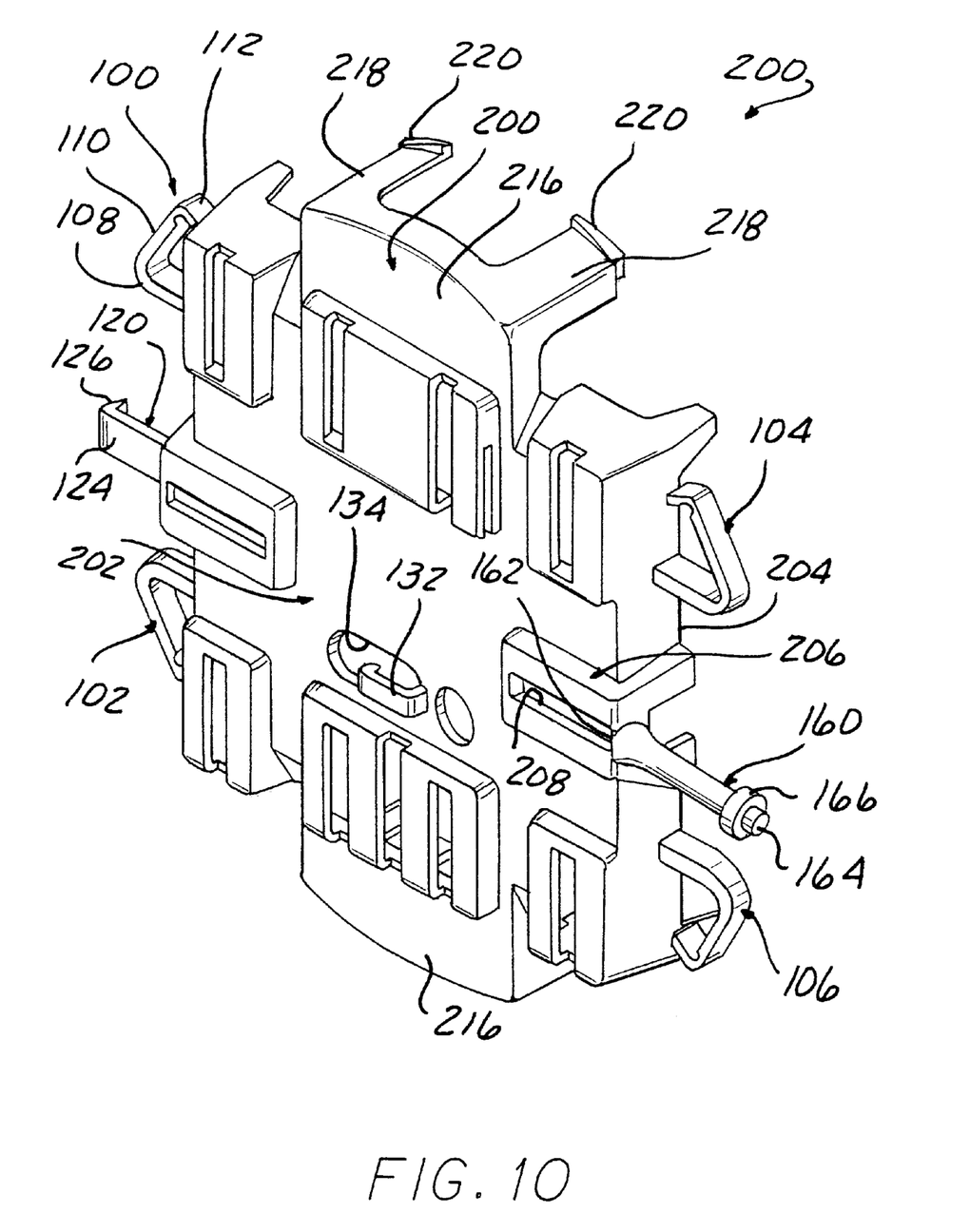
FIG. 10 is an enlarged, perspective view of the insulated safety shield shown in FIG. 1.

Referring now to FIGS. 10 and 11, there is depicted a wire guide or wire wrap means formed integrally on the safety shield 10 for winding up the cables or conductors 15 attached to the watthour meter 11 when the watthour meter 11 is mounted in the socket adapter housing 12.

In one aspect of the safety shield 200, at least one pair of spaced, opposed wire guides 100 and 102 are integrally formed on opposite sidewalls 204 of the safety shield 10, preferably adjacent the sidewalls 204, from which the flanges 216 project. As also shown in FIG. 3, an optional second pair of wire guides 104 and 106 are also formed on the same sidewalls 204, but adjacent the opposed intervening sidewall 204 from which the opposed flange 216 extends.

The wire guides 101, 102, 104, and 106 may take any conventional shape, but are preferably in a hook-like shape to provide a surface or edge about which the watthour meter cable is can be easily wound in a variety of back and forth or cris-cross patterns over the safety shield 10. By way of example only, each wire guide 100, 102, 104 and 106 has an arm-like shape formed of a first leg 108, projecting from one sidewall 204 of the safety shield 10, a second leg 110 angularly disposed, preferably at an acute angle in the first leg 108 and an out tip 112 also disposed at an angle to the second leg, preferably at a 90° angle. The outer end of the tip 112 is spaced from the adjacent sidewall 204 of the safety shield 10 to provide an opening for insertion of the watthour meter cable is therethrough.

In this arrangement, as shown by the phantom lines 114, any watthour meter cable or cables 15 can be wound around the first legs 108 of each pair of wire guides 100 and 102, and/or 104 and 106. The second legs 110 and the tips 112 of each wire guide 100, 102, 104 and 106 act as protectors for retaining the wrap cables 15 in position about the opposed wire guides 100 and 102 or 104 and 106.

It will be noted that this winding arrangement and the position of the wire guides 100, 102, and 104, 106 in opposed pairs on opposite sides of the safety shield 10 disposes the wrapped or wound watthour meter cables 15 outside of the watthour meter blade terminals 13 and meter feet 409 thereby preventing any pinching or breaking of the cable 15 during insertion of the blade terminals 13 watthour meter 11 through the slots 208 in the safety shield 200.

The wire guide feature of the present safety shield 200 in another aspect of the wire guide feature of the present invention can be embodied in opposed flanges 120 and 122 which project laterally outward from opposed sidewalls 204 of the safety shield 10, generally along the sidewalls 204 extending between the end flanges 216 as shown in FIGS. 10 and 11. The flanges 120 and 122 include a leg 124 which projects laterally outward from one of the sidewalls 204 and a depending outer leg or tip 126 which projects angularly from the outer end of the first leg 124, such as generally perpendicular therefrom. The tip 126 functions to retain the cables 15 within the confines of the flanges 120, 122 and the adjoining sidewall 204 of the safety shield 200.

As shown in FIG. 11, the watthour meter cable 15 may be wound ill a figure eight pattern 130 about the flanges 120 and 122 and the adjacent bosses 206 on the top wall 202 of the safety shield 200. This arrangement ensures that the cable 15 is not disposed in a position which would be pinched or broken by insertion of the watthour meter blade terminals 13 through the slots 208 in the bosses 206 of the safety shield 200.

The wire guide feature of the present invention also, in another aspect, is in the form of a center clip denoted in one aspect by reference number 132. The clip 132 is in the form of a flange projecting laterally across the top wall 202 of the safety shield 200 over an aperture 134 formed in the top wall 202. The aperture 34 extends through the top wall 202 and allows the passage of a telephone wire or cable 15 therethrough. The telephone cable 15 enters the interior of the socket adapter housing 12 through an aperture 138 in the sidewall 26 of the socket adapter housing 12. The telephone cable 15 is wound in a plurality of turns about the flange 132 which acts as a strain relief for the telephone cable 136.

As shown in FIGS. 10–14, the safety shield 200 is provided with a light transmitting means or guide, also known as a "light pipe" 160 which guides light generated internally within the socket adapter housing 12, such as by an illuminated light source 174a, 174b on the circuit board 42 or element mounted within the socket adapter housing 12 within the confines of the safety shield 200, to an external, more readily visible location, such as the location which is visible externally of the joined watthour meter 11 and the watthour meter socket adapter housing 12. The light pipe 160 is formed of a light transmissive material, such as a transparent, plastic. Preferably, where the entire safety shield 200 is formed of a transparent plastic, the light pipe 160 is integrally molded with the safety shield 200 as a unitary part of the safety shield 200.

The light pipe 160 has a first light input end 162 which is disposed adjacent the side edge of one slot 208 in one of the bosses 206, such as the boss 206 disposed along one of the sidewalls 204 at the sixth watthour meter jaw contact position. The first end 162 of the light pipe 160 is open or exposed to ambient so as to receive light generated beneath the safety shield 200, by the light source 164, such as one of the LEDs 174a or 174b, shown in FIG. 3, which is mounted on the circuit board 42 carried within the socket adapter housing 12. The light pipe 160 has an output or light discharging end 165. A collar 166, shown by example only, is disposed adjacent to the light discharge end 165 and serves as a seat for a seal member or O-ring 167 which is disposed in proximity to the sidewall 26 of the socket adapter housing 10 as shown in FIG. 14. The collar 166 is positioned to provide an outward force on the seal member 167 to compress the seal member 167 against the sidewall 26 of the housing 12 to form a seal about the aperture in the sidewall 26.

In this position, the light discharge end 165 of the light pipe 166 extends exteriorly or is visible through an aperture in the sidewall 26. In this manner, the light discharge end 164 is visible externally of the sidewall 26 of socket adapter housing 12 so as to provide an indication of the illumination state of the illuminated device, such as the LEDs 174a or 174b, for whatever function the LEDs serve in the circuit mounted within the socket adapter housing 12. Examples of such circuitry include a blown or open surge suppression device, a watthour meter tampering indicator, etc.

Figure 13:
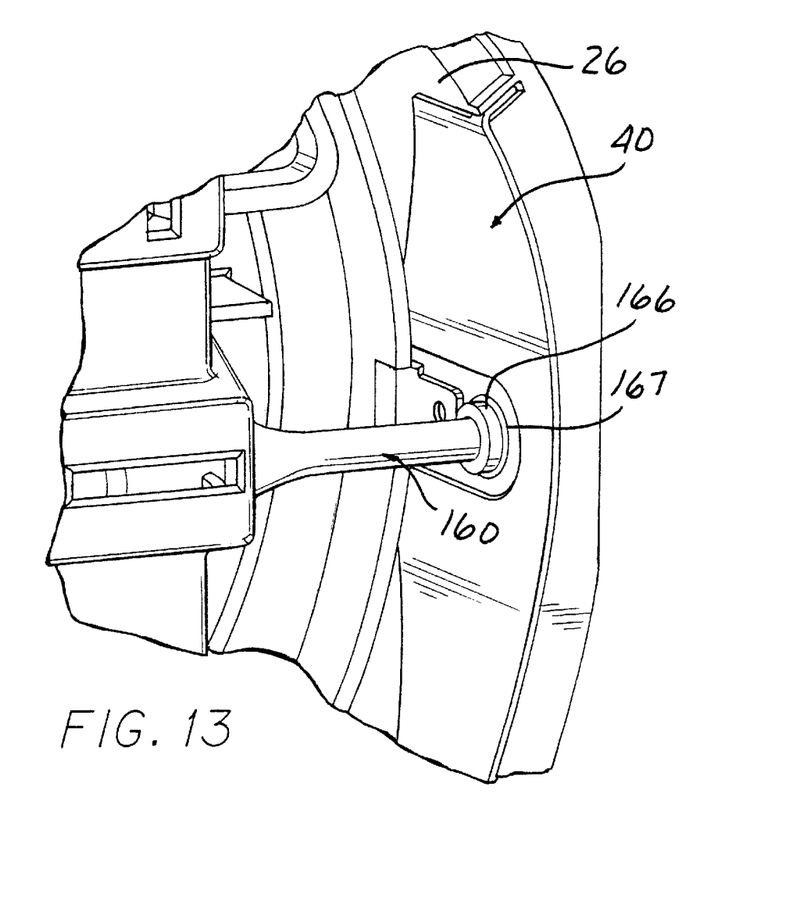
FIG. 13 is a partial, perspective view of the safety shield and socket adapter shown in FIG. 10.

As also shown in FIG. 13, the light discharge end 164 of the light pipe 160 is also disposed through an aperture in the surge ground suppression member 40 so as not to interfere with the function of the surge suppression member.

Although the light pipe 160 replaces one of the intermediate flanges which form the intermediate wire guides 124 and 126, the light pipe 160 can act as a replacement for the wire guide flange 126 by wrapping a cable 15 about the light pipe 126 and the opposed wire guide 124 in the same manner as described above and shown in phantom in FIG. 10.

In summary, there has been disclosed an improved watthour meter socket adapter with surge suppression protection which provides signals external of the socket adapter indicative of status of the surge suppression elements. The addition of a relay having a switchable contact which is switched to the signal generating position when one of the surge suppression elements opens enables automatic meter reading equipment to detect an the state of surge suppression element in a remotely located metered site. The provision of a light pipe on a safety shield mounted over the jaw contacts in the socket adapter transmits light generated by LED(s) on the surge suppression circuit board exteriorly of the socket adapter for the visual indication of the status of the surge suppression element thereby eliminating any need to open the meter/socket interface to determine the status of the surge suppression element as previously required.

Further, the socket adapter includes a unique barrier brackets which serve to function to both locate the jaw contacts in the adapter and to position the circuit board carrying the surge suppression elements in the socket adapter thereby reducing assembly time and cost of the socket adapter.

What is claimed is:

1. An electrical service apparatus having a plurality of jaw contacts connected to electrical conductors and normally receiving a watthour meter, the electrical service apparatus comprising:

a housing;

line and load contacts mountable in the housing and adapted for receiving blade terminals from a watthour meter;

a surge suppression circuit including surge suppression elements carried on a circuit board mountable in the housing, the surge suppression elements connected to certain of the line and load contacts; and a plurality of electrically insulating barriers carried in the housing and disposed adjacent to at least certain contacts in the housing, the barriers releasibly engaging and two dimensionally, fixing the circuit board in the housing.

2. The electrical service apparatus of claim 1 wherein:

the electrically insulating barriers position the circuit board in at least one of a lateral position and a longitudinal position within the housing.

3. The electrical service apparatus of claim 1 wherein:

the circuit board has a first portion and a second portion extending from the first portion;

the first and second portions of the circuit board disposable between separate electrical insulating barriers for positioning the circuit board both laterally and longitudinally within the housing.

4. The electrical service apparatus of claim 1:

signal generating means, carried on the circuit board, for generating a signal when the surge suppression circuit changes state.

5. The electrical service apparatus of claim 4 further comprising:

means, coupled to the signal generating means, for transmitting the signal remotely from the housing.

6. The electrical service apparatus of claim 5 wherein the transmitting means is a relay having at least one switchable contact.

7. The electrical service apparatus of claim 1 wherein the surge suppression circuit further comprises:

an electrically conductive link coupled between a power connection of one of the line and load contacts in the housing and one of the surge suppression elements, the electrically conductive link spaced from one of the line and load contacts.

8. The electrical service apparatus of claim 1 further comprising:

a light source mounted on the circuit board, the light source indicating the status of the surge suppression elements on the circuit board;

an electrically insulating shield mountable over the contacts within the housing; and a light transmissive guide carried on the shield and having a first end disposed adjacent to the light source on the circuit board and a second end viewable exteriorly of the housing for transmitting light generated by the light source externally of the housing.

9. The electrical service apparatus of claim 8 further comprising:

an aperture formed in a sidewall of the housing, the second end of the light transmissive guide communicable with the aperture.

10. The electrical service apparatus of claim 9 further comprising:

a seal member mounted on the light transmissive guide adjacent to the aperture, the seal member sealing the aperture.

11. The electrical service apparatus of claim 10 further comprising:

a collar mounted on the light transmissive guide, the collar spaced from the second end of the guide, the collar providing a compressive force on the seal member against the sidewall of the housing.

12. A watthour meter socket adapter apparatus having a plurality of jaw contacts connectable to watthour meter jaw contacts, the socket adapter comprising:

a housing;

a surge suppression circuit including surge suppression elements carried on a circuit board mountable in the housing, the surge suppression elements connected to certain of the jaw contacts in the housing;

signal generating means, carried on the circuit board, for generating a signal when the surge suppression circuit is in an open, non-conductive state; and switch means, coupled to the signal generating means, for transmitting an electrical signal for remote communication externally of the housing to an electrical service provider indicating a change of state of the surge suppression elements.

13. The socket adapter apparatus of claim 12 wherein:

the switch means is a relay having at least one switchable contact.

14. The socket adaptor apparatus of claim 12 further comprising:

a light source mounted on the circuit board, the light source indicating the status of the surge suppression elements on the circuit board;

an electrically insulating shield mountable over the jaw contacts within the housing; and a light transmissive guide carried on the shield and having a first end disposed adjacent to the light source on the circuit board and a second end viewable exteriorly of the housing for transmitting light generated by the light source externally of the housing.

15. The socket adapter apparatus of claim 14 wherein:

an aperture formed in a sidewall of the housing, the second end of the light transmissive guide communicable with the aperture.

16. The socket adapter apparatus of claim 15 further comprising:

a seal member mounted on the light transmissive guide adjacent to the aperture, the seal member sealing the aperture.

17. The socket adapter apparatus of claim 16 further comprising:

a collar mounted on the light transmissive guide, the collar spaced from the second end of the guide, the collar providing a compressive force on the seal member against the sidewall of the housing.

18. The socket adapter apparatus of claim 14 wherein the signal generating means comprises:

an electrically conductive link coupled between a power connection of one of the line and load contacts in the housing and one of the surge suppression elements, the electrically conductive link spaced from one of the line and load contacts; and an electrically insulating barrier carried on the shield and disposable between the electrically conductive link and an adjacent contact to electrically isolate the electrically conductive link from the contact.

\* \* \* \* \*